United States Patent
Morgan

(10) Patent No.: US 11,142,163 B2
(45) Date of Patent: Oct. 12, 2021

(54) GUIDE ASSEMBLY FOR SEAT BELT WEBBING

(71) Applicant: ZF Passive Safety Systems US Inc., Washington, MI (US)

(72) Inventor: Robert L. Morgan, New Baltimore, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 48 days.

(21) Appl. No.: 16/593,216

(22) Filed: Oct. 4, 2019

(65) Prior Publication Data

US 2021/0101560 A1    Apr. 8, 2021

(51) Int. Cl.
*B60R 22/24* (2006.01)
*B60R 22/18* (2006.01)

(52) U.S. Cl.
CPC ...... *B60R 22/24* (2013.01); *B60R 2022/1818* (2013.01)

(58) Field of Classification Search
CPC ............ B60R 22/24; B60R 2022/1818; B60R 2022/1831; B60R 22/18; B60R 22/20
See application file for complete search history.

(56) References Cited

U.S. PATENT DOCUMENTS

| 5,037,135 A | 8/1991 | Kotikovsky et al. |
| 5,762,371 A * | 6/1998 | Noguchi ............... B60R 22/203 280/801.2 |
| 7,806,439 B2 | 10/2010 | Clute |
| 2005/0173916 A1 * | 8/2005 | Sugimoto ............. B60R 22/203 280/801.1 |
| 2007/0114777 A1 * | 5/2007 | Gray ...................... B60R 22/24 280/808 |
| 2015/0210246 A1 * | 7/2015 | You ......................... B60R 22/24 242/397.5 |

FOREIGN PATENT DOCUMENTS

| DE | 102016007326 A1 * | 12/2017 | ............. B60R 22/24 |
| KR | 20120044757 A * | 5/2012 | |
| WO | WO-2015092891 A1 * | 6/2015 | ............. B60R 22/24 |

* cited by examiner

*Primary Examiner* — Paul N Dickson
*Assistant Examiner* — Daniel M. Keck
(74) *Attorney, Agent, or Firm* — Tarolli, Sundheim, Covell & Tummino LLP

(57) ABSTRACT

In one aspect, a guide assembly for seat belt webbing in a vehicle includes a support member and a locking member extending through the support member. The support member engages the locking member when a predetermined force is exerted by the seat belt webbing onto the support member. The locking member prevents the support member from pivoting relative to the vehicle when the support member engages the locking member. In another aspect, a guide assembly for seat belt webbing in a vehicle includes a support member having a first locking projection, a locking member having a second locking projection, and a bushing positioned radially between the locking member and the support member. The first locking projection penetrates into and/or through the bushing to engage the second locking projection when a predetermined force is exerted by the seat belt webbing onto the support member.

20 Claims, 5 Drawing Sheets

GUIDE ASSEMBLY FOR SEAT BELT WEBBING

FIELD OF THE INVENTION

The present invention relates to a guide assembly for seat belt webbing in a vehicle. More particularly, the present invention relates to a guide assembly for seat belt webbing having a locking member that prevents a support member of the guide assembly from pivoting.

BACKGROUND OF THE INVENTION

A three-point seat belt system typically includes a guide or D-ring that is mounted to a structure of the vehicle. Seat belt webbing of the three-point seat belt system extends from a retractor and through a webbing slot of the guide. The seat belt webbing slides on a guide surface of the guide as it passes through the webbing slot.

Forces applied to the seat belt webbing are transferred to the guide. The guide transfers the force to the structure of the vehicle. For example, during a frontal vehicle crash condition in which an occupant of a seat is restrained by the seat belt system, the retractor of the seat belt system can lock to prevent withdrawal of the seat belt webbing. Due to the momentum of the occupant, the occupant tends to move forward relative to the seat. The forward movement of the occupant and the locking retractor can apply forces to the seat belt webbing, which are transferred to the guide by the seat belt webbing. The guide transfers the forces to the structure of the vehicle.

The direction and magnitude of the forces applied to the guide varies depending upon a variety of factors, such as crash conditions (e.g., speed and impact angle), the size of the occupant, the location of the guide relative to the seat, and the location of the retractor relative to the guide. Since the forces may be applied to the guide in various directions, the guide may be pivotable relative to the structure of the vehicle. The pivoting movement of the guide helps maintain a perpendicular position of the webbing slot relative to a resultant force of the seat belt webbing (i.e., the combination of all of the forces of the seat belt webbing) acting through the seat belt webbing onto the guide.

Seat belt webbing, when viewed in section, preferably extends flat across the surface of the guide upon which it slides. When extending flat across the surface, the seat belt webbing is evenly loaded across its width and distributes the force evenly along the surface of the guide. Seat belt webbing passing through a guide may, however, experience a phenomenon known as "dumping" when the vehicle rapidly decelerates, such as during a collision. Dumping is the bunching together of the seat belt webbing at one end of the webbing slot along with the pivoting motion of the guide as a result of that bunching. When the vehicle rapidly decelerates, the seat belt webbing may laterally slide and bunch up at one end of the webbing slot. Bunching can interfere with the seat belt webbing being smoothly withdrawn or retracted and cause forces exerted on the seat belt webbing to be concentrated on a particular portion of the guide. Further, as the seat belt webbing bunches at one end of the webbing slot, forces acting through the seat belt webbing on the guide tend to cause the guide to rotate so that the perpendicular positioning of the webbing slot relative to the resultant force acting through the seat belt webbing onto the guide is not maintained.

The tendency of the seat belt webbing to dump increases as the forces exerted by the seat belt webbing on the guide increase. Therefore, it may be desirable to provide a guide designed to help prevent dumping.

SUMMARY OF THE INVENTION

According to one aspect, a guide assembly for seat belt webbing in a vehicle comprises a support member having a mounting portion for pivotably mounting the support member to the vehicle and a guiding portion through which the seat belt webbing extends, and a locking member extending through the support member. The support member engages the locking member when a predetermined force is exerted by the seat belt webbing onto the support member. The locking member prevents the support member from pivoting relative to the vehicle when the support member engages the locking member.

According to another aspect, alone or in combination with any other aspect, the mounting portion can have a mounting aperture and at least one first locking projection that extends into the mounting aperture. The locking member can extend through the mounting aperture and have at least one second locking projection on a periphery thereof. The support member can be pivotable about the locking member relative to the locking member. The at least one first locking projection can engage the at least one second locking projection when the predetermined force is exerted by the seat belt webbing onto the support member. The at least one second locking projection can prevent the support member from pivoting relative to the locking member when the at least one first locking projection engages the at least one second locking projection.

According to another aspect, alone or in combination with any other aspect, the support member can have a plurality of first locking members and the locking member can have a plurality of second locking projections.

According to another aspect, alone or in combination with any other aspect, the support member can be configured to move in a direction of the predetermined force relative to the locking member so that the at least one first locking projection of the support member is moved into engagement with the at least one second locking projection of the locking member when the predetermined force is exerted by the seat belt webbing onto the support member.

According to another aspect, alone or in combination with any other aspect, as the support member moves in the direction of the predetermined force, the at least one first locking projection can move toward a central axis of the locking member to engage the at least one second locking projection. The support member can be configured to pivot about the central axis relative to the locking member.

According to another aspect, alone or in combination with any other aspect, the guide assembly can further comprise a bushing having a portion positioned in the mounting aperture radially between the locking member and the support member. A portion of the support member can penetrate into and/or through the bushing to engage the locking member when the predetermined force is exerted by the seat belt webbing onto the support member.

According to another aspect, alone or in combination with any other aspect, the bushing can include a dividing portion and two shoulder portions that extend outward from the dividing portion. The dividing portion can be positioned radially between the locking member and the support member. The dividing portion and the shoulder portions can define a U-shaped channel. A portion of the support member can extend into the U-shaped channel.

According to another aspect, alone or in combination with any other aspect, the bushing can have a split extending therethrough that divides the bushing and separates oppositely facing first and second bushing ends from one another.

According to another aspect, alone or in combination with any other aspect, the guide assembly can further comprise a fastener configured to mount the guide assembly to the vehicle. The fastener can extend through a bore of the locking member and prevent the locking member from rotating about a central axis of the locking member relative to the vehicle.

According to another aspect, alone or in combination with any other aspect, the locking member can be clamped between a portion of the fastener and the vehicle to prevent the locking member from rotating about the central axis of the locking member relative to the vehicle.

According to another aspect, alone or in combination with any other aspect, the support member can be configured to move in a direction of the predetermined force relative to the locking member so that the support member is moved into engagement with the locking member when the predetermined force is exerted by the seat belt webbing onto the support member.

According to another aspect, alone or in combination with any other aspect, the support member can be configured to pivot about the locking member relative to the locking member in response to the seat belt webbing exerting a force onto the support member. The support member can be prevented from pivoting about the locking member relative to the locking member once the seat belt webbing exerts the predetermined force onto the support member.

According to another aspect, alone or in combination with any other aspect, the guiding portion of the support member can have an elongated webbing slot through which the seat belt webbing extends. The elongated webbing slot can be maintained perpendicular to a direction of the predetermined force during a rapid deceleration of the vehicle as a result of the support member being prevented from pivoting relative to the locking member.

According to another aspect, alone or in combination with any other aspect, a guide assembly for a seat belt webbing in a vehicle comprises a support member has a mounting aperture through which the support member is pivotably mounted to the vehicle and an elongated webbing slot through which the seat belt webbing extends. The support member has a first locking projection extending into the mounting aperture. The guide assembly also comprises a locking member in the mounting aperture. The locking member has a second locking projection on a periphery thereof. The guide assembly further comprises a bushing positioned radially between the locking member and the support member in the mounting aperture. The first locking projection of the support member penetrates into and/or through the bushing to engage the second locking projection of the locking member when a predetermined force is exerted by the seat belt webbing onto the support member.

According to another aspect, alone or in combination with any other aspect, the guide assembly can further comprise a fastener configured to mount the guide assembly to the vehicle. The fastener can extend through a bore of the locking member. The locking member can be clamped between a portion of the fastener and the vehicle to prevent the locking member from rotating about a central axis of the locking member relative to the vehicle. The support member can pivot about the central axis of the locking member relative to the locking member.

According to another aspect, alone or in combination with any other aspect, the support member can pivot relative to the locking member in response to the seat belt webbing exerting a force onto the support member. The second locking projection can prevent the support member from pivoting relative to the locking member when the first locking projection engages the second locking projection.

According to another aspect, alone or in combination with any other aspect, the support member can be configured to pivot about the central axis of the locking member relative to the locking member in response to the seat belt webbing exerting a force on to the support member. The support member can be prevented from pivoting about the central axis of the locking member relative to the locking member once the seat belt webbing exerts the predetermined force onto the support member.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
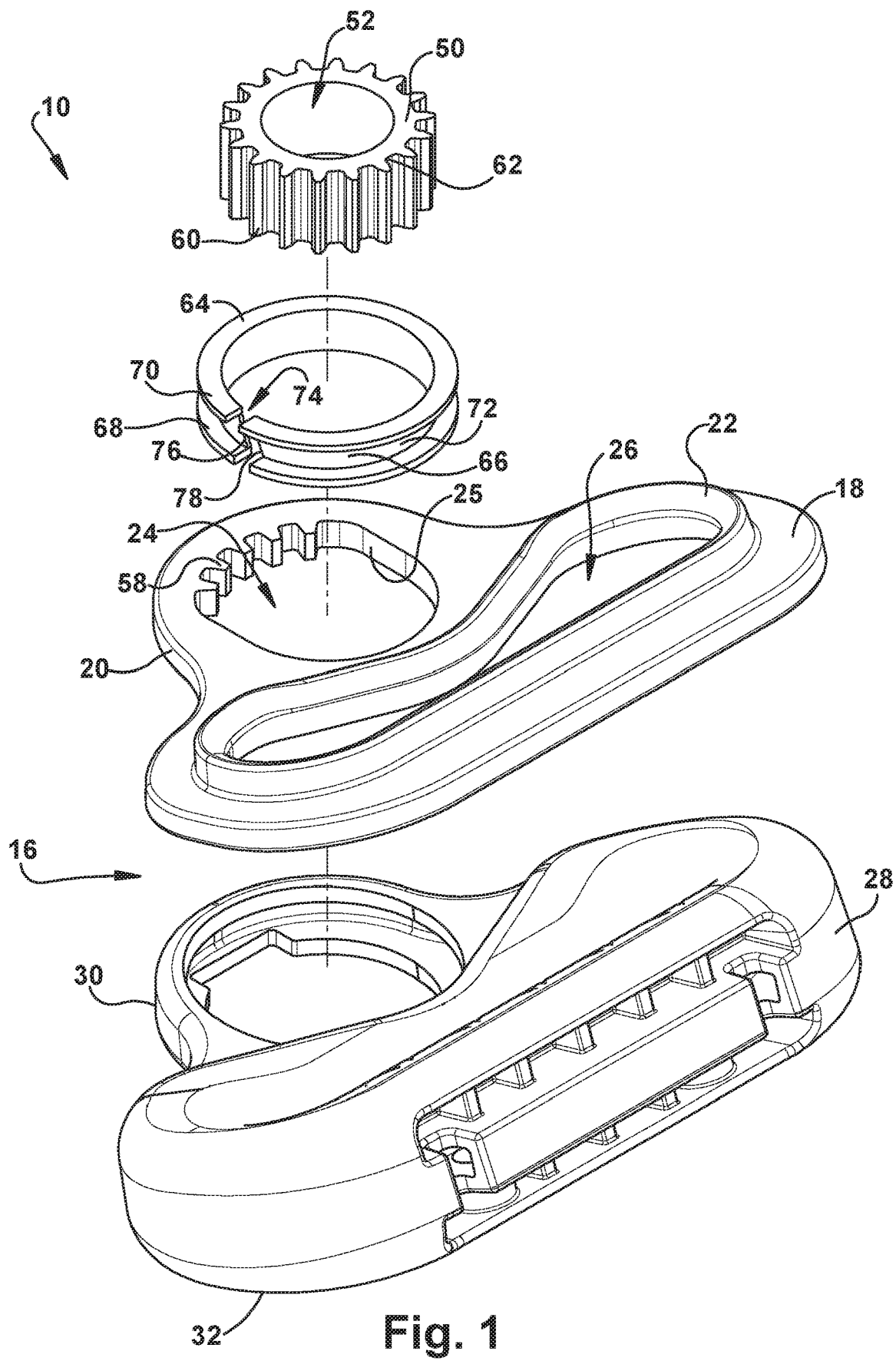
FIG. 1 is an exploded perspective view illustrating a guide assembly for seat belt webbing in a vehicle.
Figure 2:
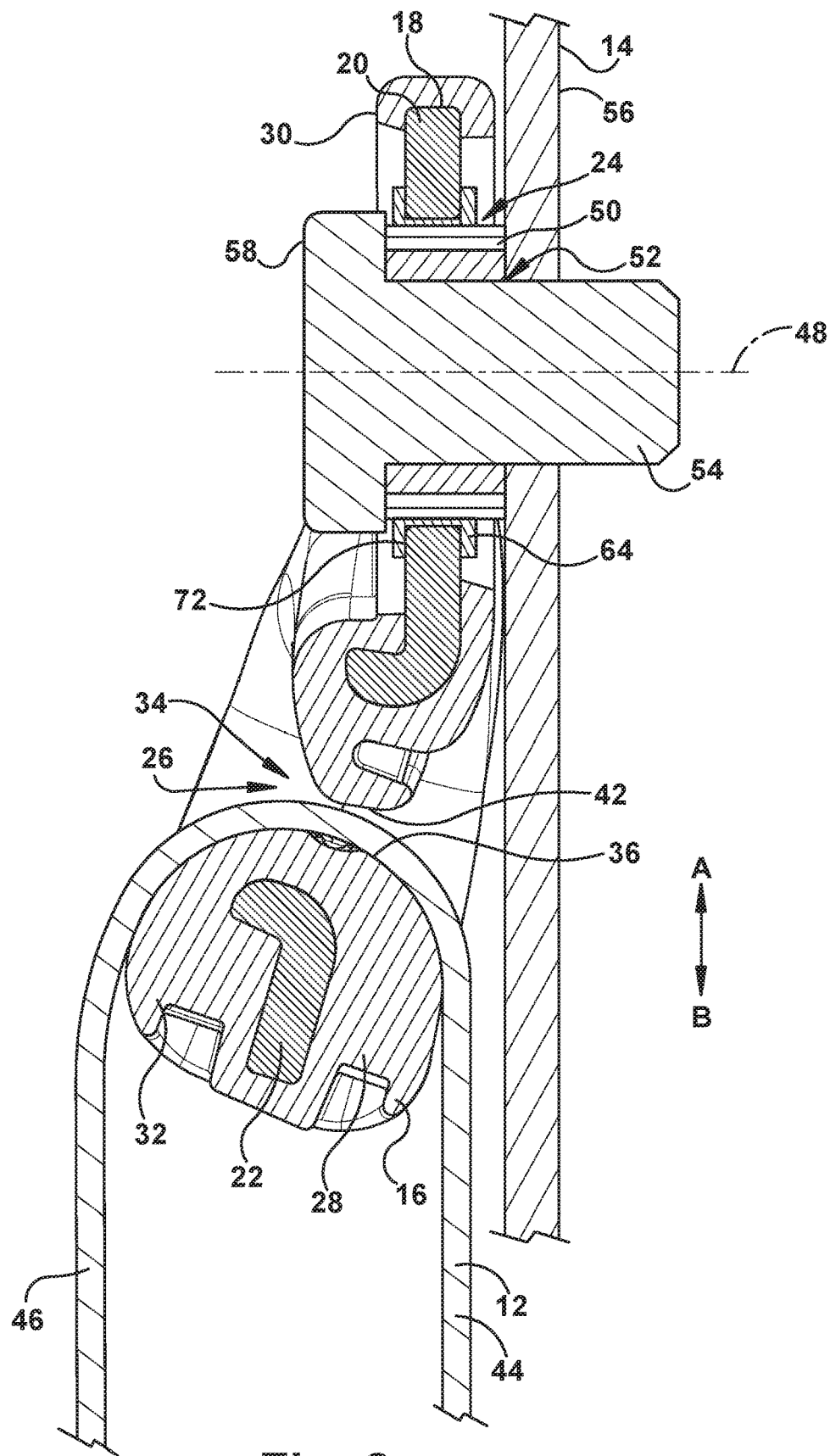
FIG. 2 is a sectional view of a portion of the apparatus of FIG. 1 in an example use environment.

FIGS. 1-2 illustrate a guide assembly 10 for seat belt webbing 12 in a vehicle 14. The guide assembly 10 can comprise what is referred to in the art as a "D-ring" assembly. The guide assembly 10 includes a support member 16. The support member 16 includes a base plate 18, such as, but not limited to, a metal or plastic base plate. The base plate 18 includes a mounting portion 20 for mounting the support member 16 in the vehicle 14 and a guiding portion 22 through which the seat belt webbing 12 extends. The base plate 18 is angled at a transition between the mounting portion 20 and the guiding portion 22 (FIG. 2). The mounting portion 20 has a mounting aperture 24 extending therethrough. The mounting aperture 24 is defined by a mounting aperture edge 25. The guiding portion 22 has an elongated webbing slot 26 through which the seat belt webbing 12 extends.

As shown in FIGS. 1-2, the support member 16 can include a covering 28, such as, but not limited to, a plastic covering, that is preferably overmolded onto the base plate 18. Instead of being overmolded onto the base plate 18, the covering 28 can instead be insert molded onto the base plate. The covering 28 covers a portion of the base plate 18. As shown in the example configuration of FIGS. 2-3, the covering 28 covers all of the base plate 18 with the exception of a portion of the base plate adjacent to the mounting aperture 24.

The covering 28 can include a mounting portion 30 and a guiding portion 32. The mounting portion 30 of the covering 28 overlies the mounting portion 20 of the base plate 18. The guiding portion 32 of the covering 28 overlies the guiding portion 22 of the base plate 18. The guiding portion 32 of the covering 28 can extend through the elongated webbing slot 26 of the base plate 18 and define an elongated webbing slot 34 of the support member 16. A lower surface 36, a first side surface 38, a second side surface 40, and an upper surface 42 of the covering 28 define the elongated webbing slot 34 of the support member 16.

Figure 3:
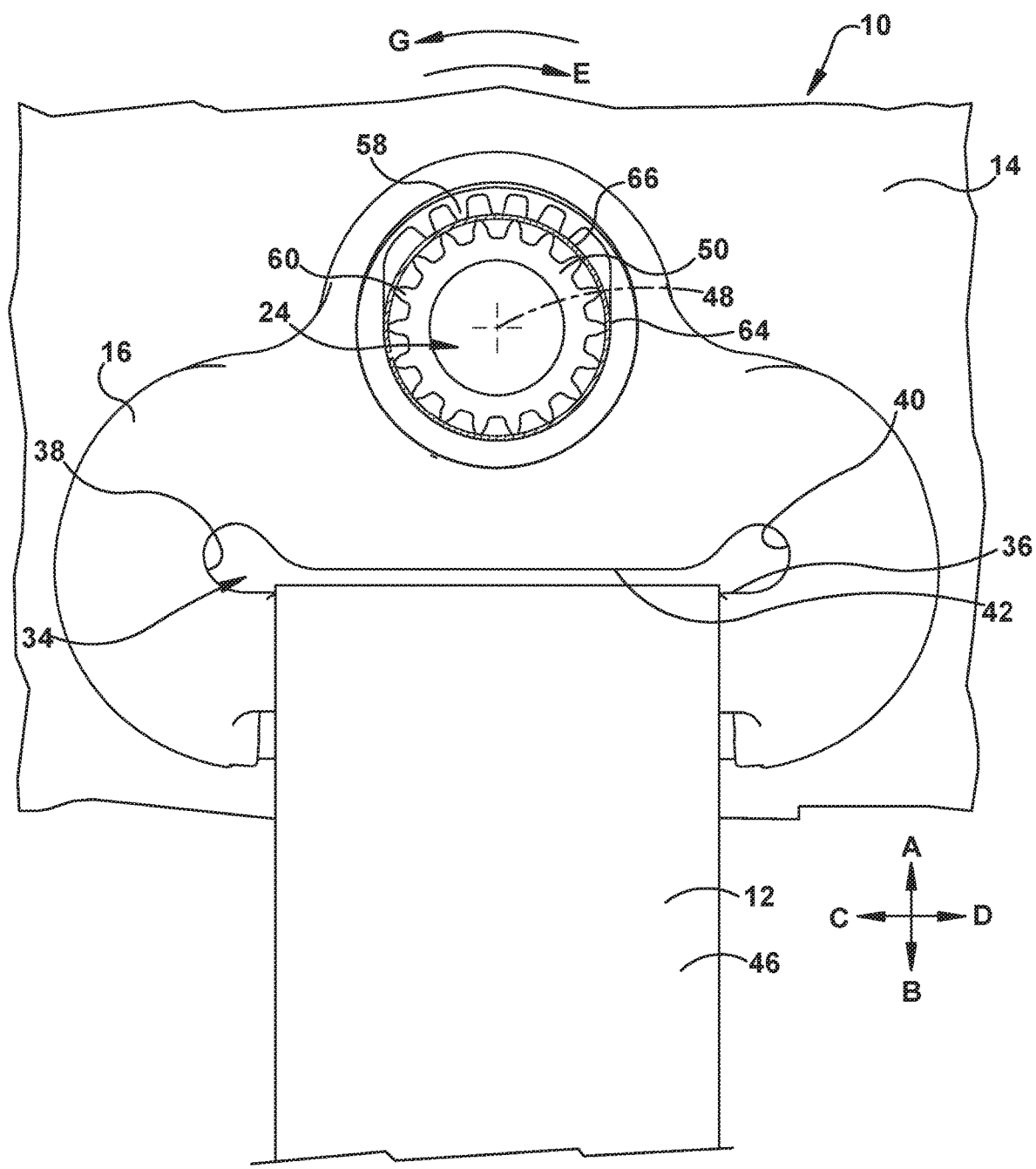
FIG. 3 is a partial side view of a portion of the apparatus of FIG. 1 in a first condition.

As shown in FIG. 2, a first portion 44 of the seat belt webbing 12 can extend generally upward (as indicated by an arrow "A") from a retractor (not shown) and through the elongated webbing slot 34. As shown in FIGS. 2-3, a second portion 46 of the seat belt webbing 12 can then extend generally downward (as indicated by an arrow "B") from the elongated webbing slot 34 to an anchor (not shown).

Figure 4:
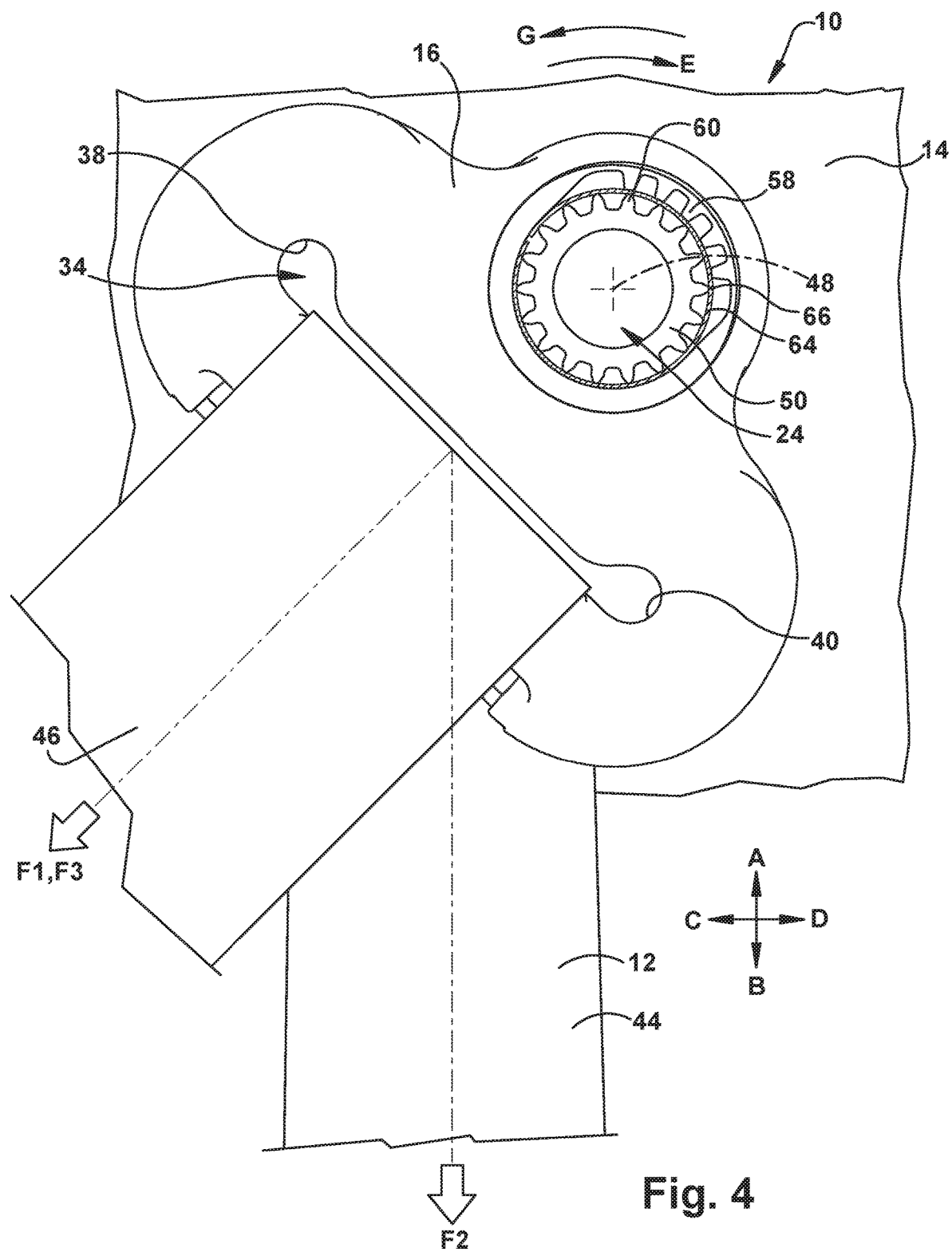
FIG. 4 is a partial side view of a portion of the apparatus of FIG. 1 in a second condition.

As shown in FIGS. 3-4, during use of the seat belt webbing 12, a vehicle occupant may exert a force F1 on the second portion 46 of the seat belt webbing that pulls the second portion of the seat belt webbing in a desired direction, such as in a vehicle forward direction (as indicated by an arrow "C") or a vehicle rearward direction (as indicated by an arrow "D"). This occupant directed force F1 is transferred to the support member 16 through the second portion 46 of the seat belt webbing 12.

As shown in FIG. 4, the retractor may exert a force F2 on the first portion 44 of the seat belt webbing 12 in a generally downward direction B during use of the seat belt webbing. The retractor directed force F2 can be the result of a spring mechanism (not shown) of the retractor exerting a biasing force on the first portion 44 of the seat belt webbing 12. The retractor directed force F2 can instead, or additionally, be the result of the retractor preventing the withdrawal of the seat belt webbing 12 as the vehicle 14 rapidly decelerates, such as during a collision. The retractor directed force F2 is transferred to the support member 16 through the first portion 44 of the seat belt webbing 12.

Each of the occupant and retractor directed forces F1, F2 are exerted in their respective directions onto their respective portions 46, 44 of the seat belt webbing 12. The occupant and retractor directed forces F1, F2 thus tend to pull their respective portions 46, 44 of the seat belt webbing 12 in the respective directions of the occupant and retractor directed forces. To help prevent lateral sliding and bunching of the seat belt webbing 12 caused by the occupant and retractor directed forces F1, F2, the support member 16 is pivotably attached to the vehicle 14.

FIG. 4 depicts the support member 16 pivoted as the result of normal vehicle occupant use, such as when a vehicle occupant puts on the seat belt webbing 12, when a vehicle occupant removes the seat belt webbing, when a vehicle occupant installs a child seat, or during panic braking. In the example situation shown in FIG. 4, the vehicle occupant has exerted a force F1 generally in the vehicle forward direction C onto the second portion 46 of the seat belt webbing 12, which is then transferred to the support member 16 through the second portion of the seat belt webbing. The retractor directed force F2 exerted on the first portion 44 of the seat belt webbing 12 is the result of the spring mechanism of the retractor acting on the first portion of the seat belt webbing. The retractor directed force F2 is transferred to the support member 16 through the first portion of the seat belt webbing.

A resultant force F3 of the seat belt webbing 12, which is the combination of the occupant and retractor directed forces F1, F2 acting on the support member 16 through the seat belt webbing, causes the support member to pivot about an axis 48 relative to the vehicle 14. The retractor directed force F2 in the example situation of FIG. 4 is generally insignificant when compared to the occupant directed force F1, and thus the resultant force F3 generally equals the occupant directed force. The resultant force F3, following the occupant directed force F1, causes the support member 16 to pivot about an axis 48 in a clockwise direction (as indicated by an arrow "E" in FIG. 4). The ability of the support member 16 to pivot allows the elongated webbing slot 34 to remain perpendicular to the resultant force F3. Remaining perpendicular to the resultant force F3 helps prevent the seat belt webbing 12 from laterally sliding and bunching at a side surface 38, 40 of the elongated webbing slot 34. Remaining perpendicular to the resultant force F3 also helps keep the seat belt webbing 12 spread evenly over the elongated webbing slot 34. The evenly spread seat belt webbing 12 is able to be smoothly withdrawn and/or retracted.

The support member 16 is capable of pivoting about the axis 48 in both the clockwise direction E and a counter-clockwise direction (as indicated by an arrow "G" in FIGS. 3-4) relative to the portion of the vehicle 14 that the support member is mounted to. The support member 16 may thus appropriately pivot in response to the resultant force F3 in either the vehicle forward or vehicle rearward directions C, D. The support member 16, however, can be configured to pivot in response to forces that are directed in directions other than, or in addition to, the vehicle forward and rearward directions C, D to comply with certain vehicle modules and/or certain mounting orientations.

Figure 5:
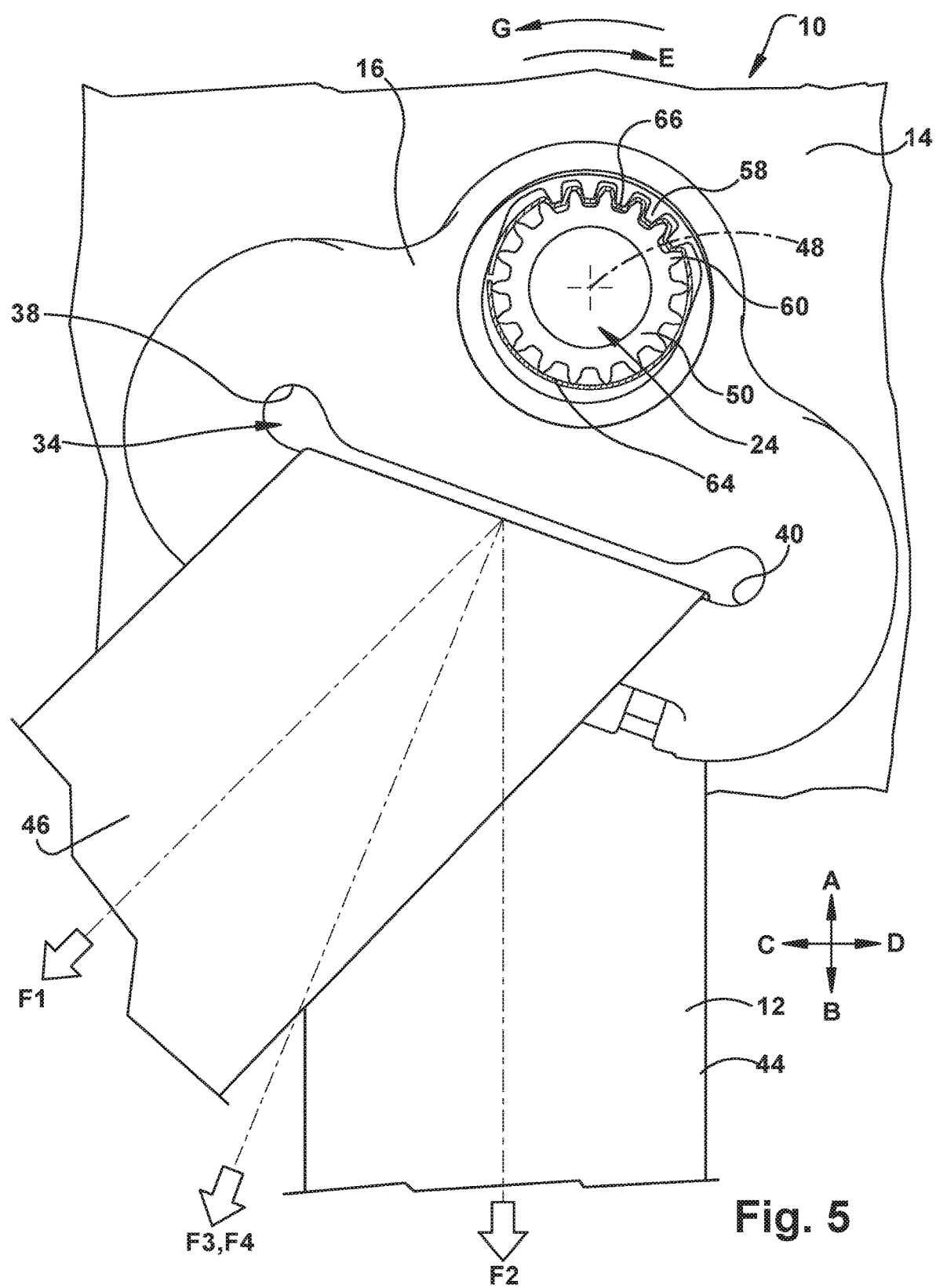
FIG. 5 is a partial side view of a portion of the apparatus of FIG. 1 in a third condition.

FIG. 5 illustrates the position of the support member 16 and the seat belt webbing 12 during a rapid deceleration of the vehicle 14, such as during a collision. In the example configuration of FIG. 5, as the vehicle 14 rapidly decelerates, the momentum of the occupant carries a vehicle occupant in the vehicle forward direction C. The forward moving vehicle occupant exerts a generally forward directed force F1 onto the second portion 46 of the seat belt webbing 12. At the same time, the retractor preventing the withdrawal of the seat belt webbing 12 during the rapid deceleration exerts a generally downward directed force F2, which can have approximately the same magnitude as the forward directed force F1, onto the first portion 44 of the seat belt webbing. The support member 16 pivots in the clockwise direction E about the axis 48 relative to the vehicle 14 in response to the resultant force F3 of the combined occupant and retractor directed forces F1, F2. The elongated webbing slot 34 remains perpendicular to the resultant force F3 as the support member 16 pivots.

To prevent the support member 16 from pivoting and maintain the elongated webbing slot 34 perpendicular to the resultant force F3 during the rapid deceleration, the guide assembly 10 includes a locking member 50. As shown in FIG. 1, the locking member 50 has a bore 52. As shown in FIG. 2, the locking member 50 extends through the mounting aperture 24 of the support member 16 with the mounting aperture and the bore 52 being aligned.

The locking member 50 can be prevented from rotating about a central axis 48 of the locking member relative to the vehicle 14 by a fastener 54. As shown in FIG. 2, the fastener 54 is configured to mount the guide assembly 10 to the vehicle 14, such as, but not limited to, a side structure 56 of the vehicle. The side structure 56 can be, for example, a pillar, a roof rail, an interior wall of the vehicle 14, or a vehicle door. The fastener 54 extends through the bore 52 of the locking member 50, and accordingly through the mounting aperture 24 of the support member 16. The locking member 50 can be clamped between a portion of the fastener 54, such as a head 58 of the fastener, and the vehicle 14 to prevent the locking member from rotating about the central axis 48 of the locking member.

As shown in FIGS. 3-4, the support member 16 is configured to pivot about the central axis 48 relative to the locking member 50. Thus, as shown in the example configuration of FIG. 4, for example, the resultant force F3 exerted onto the support member 16 causes the support member to pivot in the clockwise direction E about the central axis 48 relative to the locking member 50. However, when at least a predetermined force F4 is exerted onto the support member 16 through the seat belt webbing 12, the support member engages the locking member 50 to prevent pivotal movement of the support member.

As described above, during a rapid deceleration of the vehicle 14, the resultant force F3 of the combined occupant and retracted directed forces F1, F2 causes the support member 16 to pivot about the central axis 48 relative to the locking member 50. As shown in FIG. 5, after the support member 16 is rotated and the elongated webbing slot 34 is perpendicular to the resultant force F3, if the resultant force F3 is greater than the predetermined force F4, the support member engages the locking member 50. The locking member 50 prevents the support member 16 from pivoting once the support member engages the locking member 50. The elongated webbing slot 34 is thus maintained perpendicular to the resultant force F3 during and/or after the rapid deceleration.

Depending on the mounting configuration of the guide assembly 10 in the vehicle 14 and/or the direction of the resultant force F3 exerted by the seat belt webbing 12 onto the support member 16, the support member may not need to rotate during the rapid deceleration of the vehicle in order for the elongated webbing slot 34 to remain perpendicular to the resultant force. In this case, the support member 16 does not rotate but does still engage the locking member 50 when at least a predetermined force F4 is applied onto the support member.

The support member 16 and the locking member 50 can have any desired locking structures that prevent the support member from rotating about the central axis 48 relative to the locking member when the support member engages the locking member. As shown in FIG. 1, the support member 16 can include at least one first locking projection 58 that is configured to engage at least one second locking projection 60 of the locking member 50 when the seat belt webbing 12 exerts the predetermined force F4. In the example configuration of FIG. 1, the mounting portion 20 of the base plate 18 has a plurality of first locking projections 58. The first locking projections 58 extend into the mounting aperture 24 from the mounting aperture edge 66. In the example configuration of FIG. 1, the locking member 50 has a plurality of second locking projections 60 that are positioned along the periphery 62 of the locking member.

As shown in FIG. 5, the predetermined force F4, when exerted onto the support member 16 by the seat belt webbing 12, moves and/or pulls the support member relative to the locking member 50 in the direction of the predetermined force. As the support member 16 moves in the direction of the predetermined force F4, the at least one first locking projection 58 of the support member moves toward the central axis 48 of the locking member 50 to engage the at least one second locking projection 60 of the locking member. The at least one second locking projection 60 prevents the support member 16 from pivoting once the at least one first locking projection 58 engages the at least one second locking projection.

To prevent the support member 16 from engaging the locking member 50 under forces that are less than the predetermined force F4, the guide assembly 10 can include a bushing 64. As shown in FIG. 1, the bushing 64 includes a dividing portion 66 and two shoulder portions 68, 70 that extend radially outward from the dividing portion. The dividing portion 66 and the shoulder portions 68, 70 define a U-shaped channel 72. The at least one first locking projection 58 of the support member 16 and the mounting aperture edge 25 of the base plate 18 extend into the U-shaped channel 72. The bushing 64 can have a split 74 extending therethrough that divides the bushing and separates oppositely facing first and second bushing ends 76, 78 from one another. The split 74 allows the bushing 64 to be radially compressed and re-expanded when joining the bushing to the support member 16.

As shown in FIGS. 2-3, the dividing portion 66 of the bushing 64 is positioned radially between the locking member 50 and the support member 16. The bushing 64 is positioned so that the split 74 is spaced away from the at least one first projection 58 of the support member 16. The bushing 64 can be at least partially prevented from rotating about the central axis 48 when positioned radially between the locking member 50 and the support member 16 due to frictional forces between the bushing and each of the support member and the locking member. Alternatively, the bushing 64 can rotate about the central axis 48 as the support member 16 pivots about the central axis.

As shown in FIGS. 3-4, the dividing portion 66 separates the at least one first locking projection 58 of the support member 16 from the at least one second locking projection 60 of the locking member 50. The support member 16 pivots about the central axis 48 relative to the locking member 50 when the resultant force F3 exerted onto the support member is less than the predetermined force F4. The support member 16 is thus capable of pivoting under normal vehicle occupant use.

As shown in FIG. 5, when the predetermined force F4 is applied onto the support member 16 through the seat belt webbing 12, the at least one first locking projection 58 of the support member penetrates into and/or through the bushing 64 to engage the at least one second locking projection 60 of the locking member 50. Thus, the bushing 64 allows the support member 16 to pivot under normal occupant use and to engage the locking member 50 when the predetermined force F4 is applied onto the support member (which can occur during a rapid deceleration of the vehicle 14 caused by and/or preceding a collision).

The predetermined force F4 can be at least in part determined by the material of the bushing 64. A bushing 64 formed from a stronger material will require a greater predetermined force F4 than a bushing formed from a weaker material. Dynamic testing can be performed on each vehicle environment or model to determine a desired predetermined force F4 and then the material of the bushing 64 can be chosen accordingly. Further, as a result of performance characteristics observed during dynamic testing, the material of the bushing 64 can be chosen so that the predetermined force F4 is met or exceeded under normal crash loading, before a pre-tensioning device in the retractor is activated (when a pre-tensioning device is provided), or after a pre-tensioning device in the retractor is activated (when a pre-tensioning device is provided). The bushing 64 can be at least partially formed of polyoxymethylene, nylon, polypropylene, silicone, polyethylene, or any combination thereof.

From the above description of the invention, those skilled in the art will perceive improvements, changes and modifications. Such improvements, changes and modifications within the skill of the art are intended to be covered by the appended claims.

Having described the invention, the following is claimed:

1. A guide assembly for seat belt webbing in a vehicle, comprising:
   a support member having a mounting portion for pivotably mounting the support member to the vehicle and a guiding portion through which the seat belt webbing extends; and
   a locking member extending through the support member;
   the support member engaging the locking member when a predetermined force is exerted by the seat belt webbing onto the support member, the locking member preventing the support member from pivoting relative to the vehicle when the support member engages the locking member.

2. The guide assembly recited in claim 1, wherein the mounting portion has a mounting aperture and at least one first locking projection that extends into the mounting aperture, the locking member extending through the mounting aperture and having at least one second locking projection on a periphery thereof, the support member being pivotable about the locking member relative to the locking member, the at least one first locking projection engaging the at least one second locking projection when the predetermined force is exerted by the seat belt webbing onto the support member, the at least one second locking projection preventing the support member from pivoting relative to the locking member when the at least one first locking projection engages the at least one second locking projection.

3. The guide assembly recited in claim 2, wherein the support member has a plurality of first locking members and the locking member has a plurality of second locking projections.

4. The guide assembly recited in claim 2, wherein the support member is configured to move in a direction of the predetermined force relative to the locking member so that the at least one first locking projection of the support member is moved into engagement with the at least one second locking projection of the locking member when the predetermined force is exerted by the seat belt webbing onto the support member.

5. The guide assembly recited in claim 4, wherein as the support member moves in the direction of the predetermined force, the at least one first locking projection is moved toward a central axis of the locking member to engage the at least one second locking projection, the support member being configured to pivot about the central axis relative to the locking member.

6. The guide assembly recited in claim 1, further comprising a bushing having a portion positioned in the mounting aperture radially between the locking member and the support member, wherein a portion of the support member penetrates into and/or through the bushing to engage the locking member when the predetermined force is exerted by the seat belt webbing onto the support member.

7. The guide assembly recited in claim 6, wherein the bushing includes a dividing portion and two shoulder portions that extend outward from the dividing portion, the dividing portion being positioned radially between the locking member and the support member, the dividing portion and the shoulder portions defining a U-shaped channel, a portion of the support member extending into the U-shaped channel.

8. The guide assembly recited in claim 6, wherein the bushing has a split extending therethrough that divides the bushing and separates oppositely facing first and second bushing ends from one another.

9. The guide assembly recited in claim 1, further comprising a fastener configured to mount the guide assembly to the vehicle, the fastener extending through a bore of the locking member and preventing the locking member from rotating about a central axis of the locking member relative to the vehicle.

10. The guide assembly recited in claim 9, wherein the locking member is clamped between a portion of the fastener and the vehicle to prevent the locking member from rotating about the central axis of the locking member relative to the vehicle.

11. The guide assembly recited in claim 1, wherein the support member is configured to move in a direction of the predetermined force relative to the locking member so that the support member is moved into engagement with the locking member when the predetermined force is exerted by the seat belt webbing onto the support member.

12. The guide assembly recited in claim 1, wherein the support member is configured to pivot about the locking member relative to the locking member in response to the seat belt webbing exerting a force onto the support member, the support member being prevented from pivoting about the locking member relative to the locking member once the seat belt webbing exerts the predetermined force onto the support member.

13. The guide assembly recited in claim 12, wherein the guiding portion of the support member has an elongated webbing slot through which the seat belt webbing extends, the elongated webbing slot being maintained perpendicular to a direction of the predetermined force during a rapid deceleration of the vehicle as a result of the support member being prevented from pivoting relative to the locking member.

14. A guide assembly for seat belt webbing in a vehicle, comprising:
   a support member having a mounting aperture through which the support member is pivotably mounted to the vehicle and an elongated webbing slot through which the seat belt webbing extends, the support member having a first locking projection extending into the mounting aperture;
   a locking member in the mounting aperture and having a second locking projection on a periphery thereof; and
   a bushing positioned radially between the locking member and the support member in the mounting aperture;
   the first locking projection of the support member penetrating into and/or through the bushing to engage the second locking projection of the locking member when a predetermined force is exerted by the seat belt webbing onto the support member.

15. The guide assembly recited in claim 14, further comprising a fastener configured to mount the guide assembly to the vehicle, the fastener extending through a bore of the locking member, the locking member being clamped between a portion of the fastener and the vehicle to prevent the locking member from rotating about a central axis of the locking member relative to the vehicle, wherein the support member pivots about the central axis of the locking member relative to the locking member.

16. The guide assembly recited in claim 14, wherein the support member pivots relative to the locking member in response to the seat belt webbing exerting a force onto the support member, the second locking projection preventing the support member from pivoting relative to the locking member when the first locking projection engages the second locking projection.

17. The guide assembly recited in claim 16, wherein the support member is configured to move in a direction of the predetermined force relative to the locking member so that the first locking projection is moved into engagement with the second locking projection when the predetermined force is exerted by the seat belt webbing onto the support member.

18. The guide assembly recited in claim 17, wherein as the support member moves in the direction of the predetermined force, the first locking projection is moved toward a central axis of the locking member to engage the second locking projection.

19. The guide assembly recited in claim 18, wherein the support member is configured to pivot about the central axis of the locking member relative to the locking member in response to the seat belt webbing exerting a force on to the support member, the support member being prevented from pivoting about the central axis of the locking member relative to the locking member once the seat belt webbing exerts the predetermined force onto the support member.

20. The guide assembly recited in claim 19, wherein the elongated webbing slot is maintained perpendicular to the direction of the predetermined force during a rapid deceleration of the vehicle as a result of the support member being prevented from pivoting relative to the locking member.

* * * * *